United States Patent [19]

Erlebach et al.

[11] Patent Number: 4,571,115
[45] Date of Patent: Feb. 18, 1986

[54] CORNER JOINT LINK FOR PLATES, PARTICULARLY FURNITURE BOARDS

[75] Inventors: Gustav Erlebach, Boblingen; Roland Hölze, Oberschwandorf; Gerhard Koch, Nagold, all of Fed. Rep. of Germany

[73] Assignee: Häfele KG, Fed. Rep. of Germany

[21] Appl. No.: 641,033

[22] Filed: Aug. 15, 1984

[30] Foreign Application Priority Data

Aug. 25, 1983 [DE] Fed. Rep. of Germany ....... 3330584
Dec. 21, 1983 [DE] Fed. Rep. of Germany ....... 3346067

[51] Int. Cl.⁴ ............................................. F16B 13/00
[52] U.S. Cl. ..................................... 403/402; 403/295
[58] Field of Search ............................... 403/402, 295

[56] References Cited

U.S. PATENT DOCUMENTS 3,284,113 11/1966 Howell ........................... 403/298 X

FOREIGN PATENT DOCUMENTS 2925700 2/1980 Fed. Rep. of Germany ...... 403/402
2238383 2/1975 France ............................. 403/402
1128601 9/1968 United Kingdom ............... 403/402

Primary Examiner—Andrew V. Kundrat
Attorney, Agent, or Firm—McGlew and Tuttle

[57] ABSTRACT

An angled bolt is used for securing a mitered connection between two plates particularly furniture boards. To obtain a satisfactory fit between the miters, the position of the bolt shanks in the plates must be well fixed. This is obtained by a stop provided on the bolt so as to extend substantially in the plane of the joint. The stop may take the shape of a ring or a star. To be able to assemble plates also in other than right-angle positions, the connecting corner link is designed as a hinge, with the hinge pin extending perpendicularly to the bolt shanks and having flattened protruding ends which form the stops. These stops come automatically into their position in the plane of the joint.

12 Claims, 8 Drawing Figures

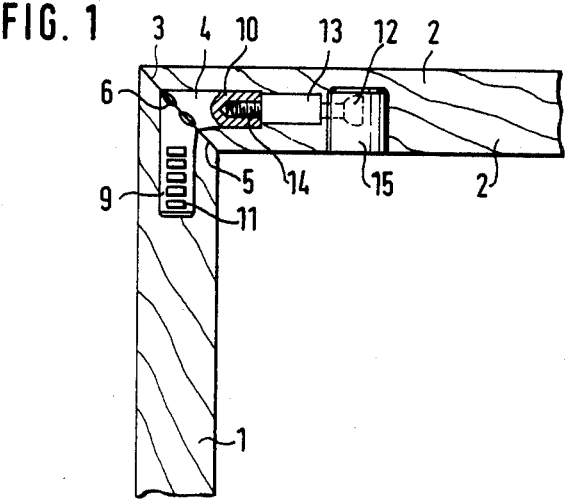
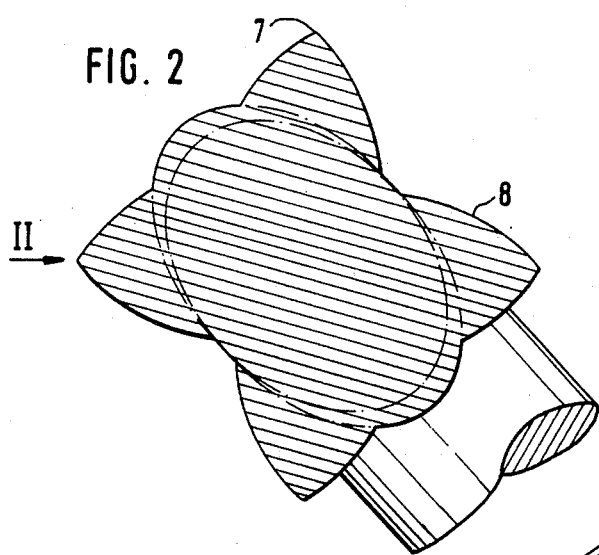
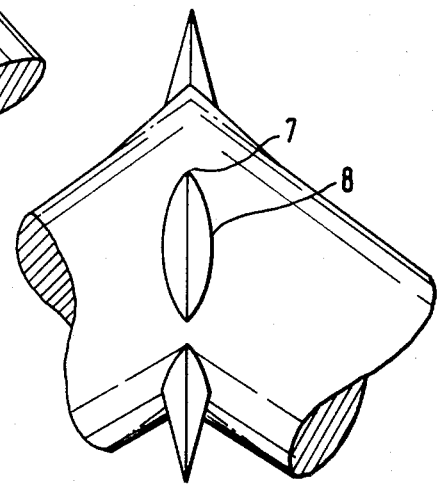

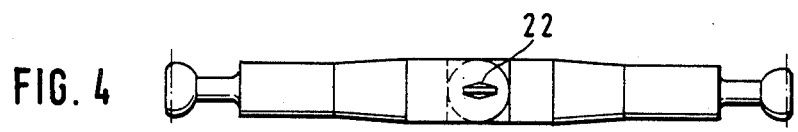
FIG. 4
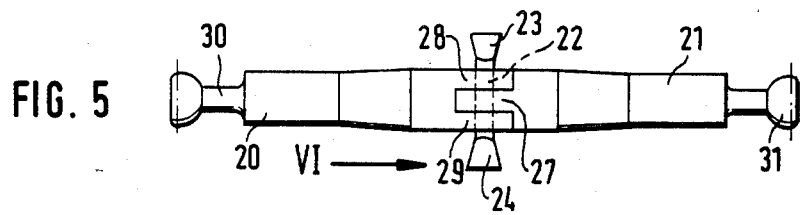
FIG. 5
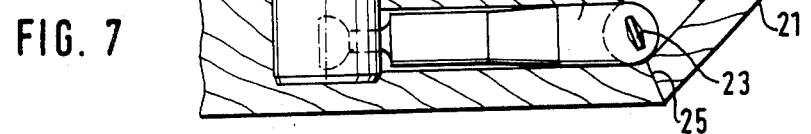
FIG. 7
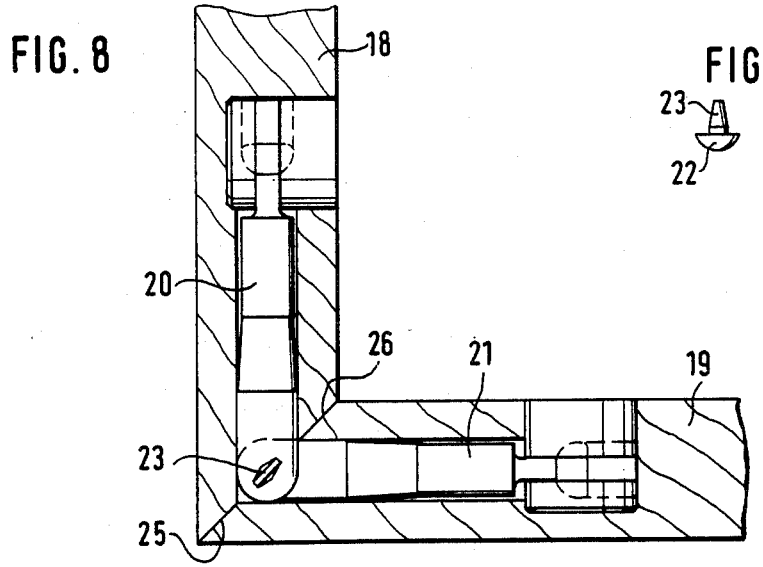
FIG. 8
FIG. 6

CORNER JOINT LINK FOR PLATES, PARTICULARLY FURNITURE BOARDS

FIELD AND BACKGROUND OF THE INVENTION

This invention relates in general to joint constructions and in particular to a new and useful miter joint construction including an angle bolt having respective angle bolt portions which extend into respective bores of elements of the joints and including a radially projecting stop portion of the bolts which is disposed in the miter plane.

In a most simple manner, two plates can be connected to each other in an angular relationship by buttingly placing the edge of one of the plates against the surface of the other plate, and securing them to each other by screws or other means for detachable fixing. If higher class products are concerned, the two plates to be connected to each other are beveled on their edges, i.e. mitered, and then fitted together. The joint may again be secured with screws, etc. However, since the edges are considerably weakened by the bevel, there is a risk that the material may break off under higher loads. It therefore became customary to secure such joints with links designed as angled bolts. Known designs of this kind did not prove satisfactory since they failed to ensure an accurate fit, especially in detachable joints.

SUMMARY OF THE INVENTION

The present invention starts from the prior art link in the shape of an angled bolt, and is directed to a connection making sure that the beveled edges will fit each other accurately, and that, if necessary, it will be possible to recurrently reestablish the accurate junction even after repeated disassemblages. This is obtained, in accordance with the invention, by providing at least one stop in the miter zone of the bolt. With this provision, one end portion of the bolt may be introduced into a corresponding bore in one of the plates up to the stop, with the stop thus exactly determining the position of the other end portion of the bolt. Upon engaging the other plate thereon, an accurate fit of the two miters is obtained. The stop can also dig into the material of the plate, thereby providing an excellent security against rotation.

Perferably, the stop extends at an angle corresponding to that of the miter, thereby ensuring a more snug and accurate fit between the edges. The stop may surround the bolt in the form of a ring, or extend star-like, with the star shape having the advantage that the individual prongs dig better into the material. Preferably, the prongs have the shape of lance-heads whose broad sides are convex.

To ensure centering of the bolts in the plate while introducing the bolt end portions therein, the bolt shanks are tapered from the miter zone outwardly to both sides. The two end portions of the bolt may be designed differently, depending on the desired manner of connection. Substantially, they may be designed as a drive-in shank with barbs, or a tightening head is provided which may be screwed by an extended leg into an interior thread of the bolt end.

With furniture plates or boards, or in cabinet work, miter connections at right angles are preferred. However, the same problem arises with connections at other angles. With the second embodiment of the invention, such connections at angles other than 90° can be effected, theoretically even up to an angle of 180°, and, of course, smaller than 90°. The bolt angle can be adjusted continuously, so that the inventive corner link is usable for any angle which might occur between parts to be joined together.

While in the first embodiment, the bolt shanks and the stop are advantageously integral with each other, in the second embodiment, the two bolt shafts are hinged to each other through a hinge pin extending perpendicularly to their longitudinal axes. Due to this hinge, two plates mitered to each other in accordance with the invention can accurately and safely be assembled to each other even at other angles than 90°. This hinged corner link has exactly the same advantages as an inventive rigid corner link according to the first embodiment of the invention. Particularly, again a recurrent disassembling and reassembling is possible, with the beveled edges again coming to fit each other accurately.

A development of the invention provides that the hinge pin projects from the bolt shanks at either side by an end portion and that these end portions are designed as stops in the miter zone. This makes it possible to utilize the hinge pin in two ways. Since these stops also have a certain thickness, they can dig into the material at both sides in the same manner as in the first embodiment.

In a particularly preferred embodiment, the two end portions of the hinge pin are plate-shaped, so that a satisfactorily large contact surface is obtained.

Another development of the invention provides that the hinge comprises an inner, central eye on one of the bolt shanks and two outer hinge eyes on the other bolt shank which are spaced apart by a distance corresponding to the thickness of the inner eye. A conventional simple and compact hinge is thereby formed. By flattening the hinge pin end portions, and thus forming the stops, after assembling the hinge, the hinge parts are automatically safely held together, since the ends are then wider than the central portion of the pin. A simple manufacturing method is thus associated with the link. The hinge eyes, of course, are made in one piece with the respective bolt shanks.

Accordingly it is an object of the invention to provide an improved miter joint comprising first and second plate which are fittable together at an angle to each other in end to end relationship in a miter joint with each plate having an aligned axially extending bore extending inwardly from the miter plane and including an angle bolt having a first shank portion engaged in the bore of the first plate and a radially projecting stop portion disposed in the miter plane and a second bolt portion extending into the bore of the second plate.

A further object of the invention is to provide an improved miter joint which includes an angle bolt portion with a stop portion disposed between bolt shank elements which extend into the respective parts to be joined together.

A further object of the invention is to provide a miter joint construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a partial sectional view of two plates which are joined to each other at a right angle and connected by means of a corner link shown partly in section, and constructed in accordance with the invention;

FIG. 2 is a cross section of the link taken in the plane of the joint;

FIG. 3 is a partial elevational view taken in the direction II of FIG. 2;

FIG. 4 is an elevational view of the corner link in a second embodiment, in stretched position, with the hinge axis extending perpendicularly to the drawing plane;

FIG. 5 is a top plan view corresponding to FIG. 4;

FIG. 6 shows a detail of FIG. 5, taken in the direction VI; and

FIGS. 7 and 8 show the hinge links of FIGS. 4 and 5 in actual use, as applied to two different angles formed between the connected plates.

DESCRIPTION OF THE PREFERRED EMBODIMENTS

Referring to the drawings in particular the invention embodied therein in FIGS. 1 to 3, comprises a miter joint for first and second plates 1 and 2 which are fittable together at an angle to each other in end to end relationship in a miter joint 3. Each plate 1 and 2 has an aligned axially extending bore which extends inwardly to the respective plate from the miter plane 3. In accordance with the invention, an angle bolt or corner link 4 includes a first shank portion 9 engaged in the bore of the first plate 1, a radially projecting stop portion 6 which is disposed in the miter plane 3 and a second shank portion of the bolt 10 which extends in the bore of the second plate 2.

Plates 1 and 2 are fitted together at their edges 3 which are cut at an angle. The connection is secured by a corner link 4 which is designed as an angled bolt. In its break zone, corner link 4 is provided with a projecting star-like stop 6 extending in a plane bisecting the link angle and, with link 4 fixed in place coinciding with the plane of the joint 5, so that stop 6 comes to be enclosed between miters 3. As shown in FIGS. 2 and 3, the individual prongs 7 of star-like stop 6 are shaped as lance heads having convex broad sides 8. Due to this shape, prongs 7 can particularly well dig into the material of plates 1, 2.

The two shanks 9 and 10 of the bolt taper from their common break sections toward their free ends. The shanks or their end portions may be designed differently. As shown in FIG. 1, bolt shank 9 is provided with barbs 11, thus designed in the same manner as a drive-in shank. The other shank 10 however, is provided with a separate end portion 13 carrying a tensioning head or tightening head 12. End portion 13 is screwed into a threaded hole 14 of bolt shank 10. Tightening head 12 is strained by means of a tensioning element 15 of conventional design (not shown in detail).

To make plates 1 and 2 ready for assemblage, bores for the two bolt shanks 9 and 10 must be provided, and shank 9 is driven into the respective bore. The taper of shank 9 provides a satisfactory centering which is a precondition for miters 3 fitting accurately together. Thereupon plate 2 is engaged on bolt shank 10, with the taper of this shank again producing a centering effect. Finally, tightening head 12 is strained by means of tensioning element 15, so that a firm and safe connection of plates 1 and 2 is obtained.

The two plates 16 and 17 (FIG. 7) or 18 and 19 (FIG. 8) assembled by means of corner links according to FIG. 4, are also mitered. However, while plates 18 and 19 have edges cut for a right angle connection, the edges of plates 16 and 17 are cut at an angle of about 120°. Consequently, the corner link or links for the connection according to FIG. 7 are fixed in a more open position than those according to FIG. 8.

In this embodiment of FIGS. 4-8, the two bolt shanks 20 and 21, again tapered toward there free ends, are not in one piece. They are hinged together by means of a hinge pin 22 extending perpendicularly to their longitudinal axes. Hinge pin 22 projects at both sides outwardly, beyond the diameter or thickness of the bolt shanks. The two protruding ends of the pin form the above mentioned stop in the plane of joint 25. Spade-shaped or plate-shaped stops may be obtained by pressing the two pin ends flat. Such an enlargement also secures the pin axially in position in the hinge is rotatable in the hinge eyes of the two bolt shanks, the stops can flatly apply against miters 25,26 so that the corner link is self-adjusting.

One of bolt shanks 21 is provided with a central hinge eye 27 while the other bolt shank 20 is provided with two lateral hinge eyes 28,29 spaced apart by the thickness of the central hinge eye 27, as shown in FIG. 5. The hinge eyes are integral with the respective bolt shanks.

In the first embodiment of FIG. 1, tightening head 12 is a separate part which is screwed into a tapped hole 14 of bolt shank 10, while bolt shank 9 has no tightening head at all. In the second embodiment of FIGS. 4-8, a tightening head 31 is provided on either of the free ends of bolt shanks 20, 21, and is integral therewith, through a neck 30. Each of these tightening heads 31,31 and also tightening head 12 of the first embodiment, cooperates with a tensioning element 32, 33, 15 which is inserted in a bore extending perpendicularly to the respective plate 16,17, 2 and to the bore in the plate receiving both shaft 20, 21,10.

While specific embodiments of the invention have been shown and described in detail to illustrate the application of the principles of the invention, it will be understood that the invention may be embodied otherwise without departing from such principles.

What is claimed is:

1. A corner link for two plates to be fitted together in a miter joint, comprising an angle bolt having first and second shank portions disposed at an angle to each other, at least one stop formation disposed between said shank portions in the miter joint, said first and second shank portions extending into respective ones of the plates, said stop having a star-shaped configuration.

2. A corner link according to claim 1, wherein said stop formation comprises a star shaped member extending radially beyond the diameters of said bolt portions and having a lance-like head formation with convex broad sides.

3. A corner link according to claim 2, wherein said angle bolt includes at least one shank portion which tapers inwardly toward its end.

4. A miter joint comprising first and second plates fitted together at an angle to each other in end to end relationship with the ends disposed in a miter plane of a miter joint, each plate having an aligned axially extending bore inwardly from said miter plane, and an angle bolt having a first shank portion engaged in the bore of said first plate and a second shank portion engaged in the bore of the second plate and with a radially projecting stop portion defined between said shank portion and extending radially beyond the bores into the material of said plates disposed in the miter plane between said first and second shank portions.

5. A miter joint according to claim 4, wherein said first shank portion has radially extending barbs thereon engageable with the first plate, said second shank portion having a tightening end portion, an inner end portion which is provided with an interior bore which is threaded, said tightening end portion being threaded to said bore.

6. A miter joint according to claim 5, wherein said bolt includes bolt shank portions and a stop all formed integrally with each other.

7. A miter joint according to claim 4, wherein said two bolt shank portions are hinged together and including a hinge extending transversely to the longitudinal axis of said shank portions.

8. A miter joint according to claim 4, wherein said two bolt portions are hinged together, said hinge including a pin portion forming said stop portion.

9. A miter joint according to claim 4, wherein said two end portions of said hinge pin are plate shaped.

10. A miter joint according to claim 4, wherein said one of said shank portions has a central hinge eye, the other of said shank portions having hinge eye portions spaced apart by the thickness of said first hinge eye being engageable over respective sides thereof to accommodate said hinge pin through the eyes which may become aligned.

11. A miter joint according to claim 4, wherein said shank portions terminate in respective hinge eye portions which interengage, said hinge eye portions being formed integral with said shank portions.

12. A miter joint according to claim 4, wherein the bores of said plates are filled by said first and second shank portions and including a tensioning member carried by one of said plates engageable with one of said shank portions, said engaged one of said shank portions including a tensioning head which may be adjusted axially in respect to the remaining portion of said shank portions.

* * * * *